United States Patent
Prince

(10) Patent No.: US 9,536,320 B1
(45) Date of Patent: Jan. 3, 2017

(54) MULTIPLE COORDINATED DETECTORS FOR EXAMINATION AND RANGING

(71) Applicant: John H. Prince, Los Altos, CA (US)

(72) Inventor: John H. Prince, Los Altos, CA (US)

(*) Notice: Subject to any disclaimer, the term of this patent is extended or adjusted under 35 U.S.C. 154(b) by 43 days.

(21) Appl. No.: 14/580,759

(22) Filed: Dec. 23, 2014

(51) Int. Cl.
| | |
|---|---|
| *G06T 7/20* | (2006.01) |
| *G06K 9/00* | (2006.01) |
| *G06K 9/32* | (2006.01) |
| *H04N 13/02* | (2006.01) |
| *H04N 13/00* | (2006.01) |
| *G06T 7/00* | (2006.01) |

(Continued)

(52) U.S. Cl.
CPC ............ *G06T 7/2093* (2013.01); *G01S 17/89* (2013.01); *G06K 9/00201* (2013.01); *G06K 9/00335* (2013.01); *G06K 9/32* (2013.01); *G06T 7/0065* (2013.01); *G06T 17/00* (2013.01); *H04N 13/0011* (2013.01); *H04N 13/0242* (2013.01); *H04N 13/0296* (2013.01); *G06K 2209/40* (2013.01); *G06T 2207/20228* (2013.01); *G06T 2210/44* (2013.01)

(58) Field of Classification Search
CPC ................ G06T 7/2093; G06T 7/0065; G06T 2207/2028; G06T 7/0022; G06T 17/00; G06T 7/0042; G06T 15/20; G06T 2200/21; G06T 3/0068; G06T 7/002; G06T 7/0057; G06T 19/00; G06T 2200/08; G06T 2210/44; G06K 9/00201; G06K 9/32; G06K 2209/40; G06K 9/00335; H04N 13/0014; H04N 13/0242; H04N 13/0246; H04N 13/0011; H04N 13/0018; H04N 2013/0081; H04N 13/0296; G01S 17/89
See application file for complete search history.

(56) References Cited

U.S. PATENT DOCUMENTS

| | | | | |
|---|---|---|---|---|
| 5,703,961 A | * | 12/1997 | Rogina | G06K 9/209 |
| | | | | 348/E13.014 |
| 6,011,863 A | * | 1/2000 | Roy | H04N 13/0011 |
| | | | | 348/E13.014 |

(Continued)

OTHER PUBLICATIONS

Philipp Merkle, Heribert Brust, Kristina Dix; Yongzhe Wang, Aljoshcha Smolic, Adaptation and Optimization of coding algorithms for mobile 3DTV, Project No. 216503; 2007-2011; p. 42 Multiview Video Coding; pp. 22-28 Simulation of MVC; p. 28, H264/AVC Plus Depth; p. 29 Auxiliary Video Stream; pp. 30-32 Specification; pp. 34-40 Simulation of MPEG-3C; p. 42 Auxiliary Syntax for Video Plus Depth; p. 43 Decoding H264/AVC Plus Depth and Specification; pp. 44-47 Simulation; pp. 48-51 Comparisons of Coding Techniques.

(Continued)

*Primary Examiner* — Manav Seth
(74) *Attorney, Agent, or Firm* — James Ray & Assoc.

(57) ABSTRACT

This invention focuses specifically on the use of epipolar lines and the use of matrix transformations to coordinate cameras. This invention organizes cameras in a manner which is intuitive and effective in perceiving perspectives which are not normally possible; to calculate range precisely; to allow redundancy; to corroborate feature recognition; and to allow perspectives from angles from which no cameras exist. By enabling remote scene reconstruction with a limited set of images, transmission bandwidth is greatly conserved.

19 Claims, 8 Drawing Sheets

(51) Int. Cl.
*G06T 17/00* (2006.01)
*G01S 17/89* (2006.01)

(56) References Cited

U.S. PATENT DOCUMENTS

| | | | | |
|---|---|---|---|---|
| 6,052,124 | A * | 4/2000 | Stein | G06T 7/0071 345/419 |
| 6,137,491 | A * | 10/2000 | Szeliski | G06K 9/209 345/419 |
| 6,175,648 | B1 * | 1/2001 | Ayache | G06K 9/20 348/42 |
| 6,327,381 | B1 * | 12/2001 | Rogina | G06T 7/0022 348/E13.014 |
| 6,424,351 | B1 * | 7/2002 | Bishop | G06T 15/04 345/427 |
| 6,441,888 | B1 * | 8/2002 | Azuma | G01S 7/481 348/131 |
| 6,965,386 | B2 * | 11/2005 | Appel | G06T 7/0028 345/629 |
| 6,975,756 | B1 * | 12/2005 | Slabaugh | G06T 15/205 345/427 |
| 7,113,632 | B2 * | 9/2006 | Lee | G06K 9/03 348/E13.014 |
| 7,212,663 | B2 * | 5/2007 | Tomasi | G01B 11/25 382/106 |
| 7,224,357 | B2 * | 5/2007 | Chen | G06T 7/0075 345/419 |
| 7,738,725 | B2 * | 6/2010 | Raskar | G06T 15/02 382/199 |
| 7,747,067 | B2 * | 6/2010 | Popescu | G01B 11/25 382/154 |
| 7,889,326 | B2 | 2/2011 | Shin et al. | |
| 7,957,007 | B2 * | 6/2011 | Raskar | G01S 17/023 356/603 |
| 8,054,471 | B2 * | 11/2011 | Sciammarella | G01B 11/25 250/208.1 |
| 8,467,628 | B2 * | 6/2013 | Coffman | G06T 7/0075 348/42 |
| 8,538,166 | B2 * | 9/2013 | Gordon | G01B 11/25 382/201 |
| 8,599,252 | B2 * | 12/2013 | Komoto | G06T 7/2006 348/135 |
| 8,610,708 | B2 * | 12/2013 | Richards | G06T 7/0061 345/419 |
| 8,755,569 | B2 * | 6/2014 | Shen | G06K 9/00335 382/107 |
| 2002/0158873 | A1 * | 10/2002 | Williamson | G06T 7/002 345/427 |

OTHER PUBLICATIONS

Gary Sullivan; Liaison statement to IMTC (International Multimedia Telecommunications Consortium) on FRExt Amendment to ITU-T Rec. H.264 | ISO/IEC 14496-10 Advanced Video Coding; Mar. 2004, Item 2. Hybrid Unsymmetrical-cross Multi-Hexagon-grid Search algorithm for Integer pixel search; Item 2.2 Unsymmetrical Cross-search; Item 3.2 Center-based Fractional Pixel Search; Item 4.4 Extended Hexagon Based Search.

Richard Szelisk; Image Alignment and Stitching, a Tutorial, Technical Report, pp. 3-5 Transformations; p. 7 Projections; pp. 7-8 Panoramas; p. 11 Spherical Coordinates; p. 16 Error Metrics; p. Error Metrics; p. 20 Fourier Transforms; pp. 24-25 Gradient Descent Function; p. 29 Jacobians of Affine Transforms; pp. 30-31 Jacobian of Planar Projective Transform; p. 33 Keypoint Detectors; p. 42 Feature Matching; pp. 7-51 Global Registration; Preliminary report Jan. 26, 2005

C.M. Bishop; Pattern Recognition and Machine Learning; Linear Models for Regression; p. 138 Linear Regression; p. 139 Basis Function; p. 140 Sigmoidal Functions; p. 141 sum of Squares Error Function; p. 141 Gradient; p. 142 Design Matrix; p. 143 Least Squares Regression Function; p. 144 Sequential Learning Algorithm; p. 145 Lagrange Multipliers; p. 146 Multiple Outputs; pp. 147-152 Bias Variance.

Susanne, Google; Cardboard Immersive Visualization System; Google launches Cardboard VR SDK for Android and Utility; See Android; Unity Software; Dec. 14, 2014.

Oculus Platform SDK; updated Jul. 15, 2016; See Oculus SDK: FBX Converter; Moble Coordinate System; Unit Quaternions; Unity Software; Unreal Engine; UDK.

Dean Vucinic; Development of a Scientific Visualization; Jul. 2007; Figs 1,2: Scientific visualization role & model; p. 4 Transformations; p. 4 Rendering; p. 8 Applicaton of Scientific Visualization Software: p. 10 Modular Visualization Environment & Toolkits; p. 22 Integrated Modeling Environment; p. 28 Data Modeling & Geometrics; p. 40 Zones, Nodes & Meshes; p. 44 Computational & Structured Topology; p. 49 Cell Connectivity; p. 55 Node Connectivity Algorithm; p. 64 Polygon Orientation; p. 66 Navigation; p. 74 Isoparametric Mapping & Matrices; p. 80 Jacobian matrix; p. 83 Metric Tensor; p. 84 Normals to Tangential Planes; p. 87 Velocity field; p. 90 Extraction Algorithms; p. 96 Sub-zones; p. 98 Isolines; p. 100 Line-Surface Intersection; p. 103 point Location Algorithm; p. 111 Newton-Raphson Approximation; p. 113 Vector Line Algorithm; p. 129 Surface Model; p. 132 Geometric Models; p. 134 Vector Fields & Lines; p. 135 Isolines; p. 146 Local Representations; p. 149 Human-compuer interface; p. 150 Perceptual Interactions; p. 159 Visualizations; p. 163 Superpositions; p. 165 Comparisons; pp. 127-190 software (Object-Oriented C++) Development; p. 191 Entity-Relationship Modeling; pp. 192-196 Model-View Controller; p. 196 System Architecture; pp. 204-207 Software IDE; p. 208 Future Developments.

\* cited by examiner

MULTIPLE COORDINATED DETECTORS FOR EXAMINATION AND RANGING

BACKGROUND OF THE INVENTION

The ability to coordinate detectors accurately, and the increasing power of computers, allows for the accumulation and organization of image data in a manner not formerly possible, at very high speeds and at a relatively low cost. The many applications include quality control in production lines, examination of internal organs, facial recognition and missile tracking.

To focus on the last problem, or opportunity, we know that the recent availability of ultra-high-speed processors allows the computation of highly complex data in speeds approaching real-time. With fast image recognition algorithms and high-speed software, 3D ranging can be done in milliseconds. This allows equally fast (and automated) response to incoming aircraft or missiles threatening a military asset—a tank, a radar station, a navy ship—all the while the missiles being unaware that they are being tracked and therefore less capable of taking evasive or jamming action.

A missile approaching at 600 mph will take six seconds to cover a mile. Its identity and vectors of range, bearing, velocity, etc. must be grasped instantly for evasive or defensive action to be taken.

Ranging relates to perception in three dimensions in that an object needs to be seen from two or more points of view in order to calculate its range and properly determine its character.

As the Navy puts it: "Three-dimensional imaging technology, using image data collected from multiple offset cameras, may be able to passively provide the automated ranging capabilities to the war fighter that were previously only available through active systems that risked the possibility of counter-detection in their use."

This invention focuses specifically on the use of epipolar lines and the use of matrix transformations to coordinate detectors: to organize them in a manner which is intuitive and effective in perceiving perspectives which are not otherwise possible; to make detectors effective over long and short ranges; to calculate range precisely; to allow redundancy; and even to allow perspectives from angles from which no detectors exist. Until recently the possibility of doing all these things virtually simultaneously did not even exist.

DESCRIPTION OF THE RELATED ART

The related art of identifying an object distance has two components (i) Passive ranging, as we do in ambient light with our eyes; and (ii) Active ranging, which involves illuminating an object with searchlights, flares, lasers, radar, etc. so that we can detect its distance, shape, velocity, etc. in the visible, infra-red, microwave, millimeter wave regions. Active ranging also includes sonar.

(i) Passive Ranging:

Single cameras held still, no matter how large and how high their resolution, can do little to create a perception of depth. Binoculars make distant scenes appear flat, and because of the small separation between their optics, cannot easily calculate range. Depth cannot easily be created using phase or wavelength differences or by other known means with two adjacent and essentially parallel light paths or beams, else we could create 3D images of stars with relatively closely spaced detectors like a pair of eyes, separated by only 65 mm. Though some believe that animals can achieve ranging by heterodyning wavelength differences within single eyes.

Thermal (infra-red) imaging and night-vision devices suffer similar issues. They take second place to visible estimation, since their resolution is not as good. For thermal imaging the wavelengths are longer and in night-vision the images tend to be fuzzy and indeterminate.

Stadimeters have been used by the armed forces of a number of countries for passive ranging since the 1800s. They rely on two well-separated incoming light beams, with prisms or mirrors to combine them on a screen, whose images can be seen simultaneously and made to overlap by manual dialing. On the dial is a scale which shows larger and larger numbers rapidly converging with distance.

Motion parallax, where a set of eyes move from one position to another, has been used since time immemorial for measuring distance, and enables people and animals to estimate distance by looking at an object from more than one point of view. It was certainly used by the Greeks in constructing their temples, and by Eratosthenes in Egypt in 200 BC in calculating the diameter of the earth and the distance to the sun.

Another feat of passively estimating distance was The Great Trigonometrical Survey of India begun in 1802. In forty years, through immense heart and labor, a Great Arc of triangles reached the Himalayas from a base-point on the sea. Using broad triangles many efforts were made (on clear days) to establish heights of certain distant peaks in the Himalayas. From 1847 to 1849 one elusive cluster of peaks was continuously re-examined and recalculated for height. In 1856 it was made public: at 8,850 meters or 19,002 feet (then), Mt. Everest was claimed as the world's tallest mountain.

Both Greeks and British understood the value of broad baselines and accurate measurements for passive ranging. Triangulation still remains a powerful tool for passive measurements of objects and distances.

Triangulation also helps with sound—our ears can determine the direction of sound. Armies (such as North Vietnam's) used multiple sonar dishes to calculate the range of US bombers.

(ii) Active Ranging:

LIDAR and RADAR have been used for many years for ranging, detection and (with associated computers) analysis of objects. However, as the Navy says: "active ranging, conducted via lasers or radar emission, and active transmission is undesirable in many circumstances. An increase in the fidelity of passive ranging and automation of the process of passive ranging will reduce the requirement for active transmission."

Although lasers have considerable range, the scattered light does not: it reduces as the square of the distance, limiting the range of lasers to a few hundred yards. And while radar and millimeter waves have the ability to penetrate clouds and fog, in the visible spectrum the resolution of their images is orders of magnitude less than with our eyes.

Bats and dolphins use sonar for estimating range, the first in air beyond the audible range, the second at low audio wavelengths for penetrating seawater. The time of flight of sound-waves can give them an accurate estimation of distance. But it is not passive.

In principle night-vision devices can be used for passive ranging but (as noted) may not be as effective as the latest in low light level imaging devices because of poor image quality. In general night-vision devices are expensive and require high voltages to run.

SUMMARY OF THE INVENTION

This invention focuses specifically on the use of epipolar lines and the use of matrix transformations to coordinate detectors. It organizes them in a manner which is intuitive and effective in perceiving perspectives which are not otherwise possible; to make detectors effective over long and short ranges; to calculate range precisely; to allow redundancy; and even to allow perspectives from angles from which no detectors exist. Through this we try to overcome certain limitations of existing imaging technology.

With modern computers we can recognize objects with templates and accurately triangulate their distances (with multiple baselines) in milliseconds.

Diagrams are given which show geometrically how this is achieved. Some notes are added on the mathematics necessary for comparing multiple images, and for the transforms needed for comparing one format to another.

What we will show in this invention that this is an efficient and exact—and therefore fast—way of creating wholly real new images from adjacent real images, in other words to create imaginary cameras which we can place at will.

Because whole scenes can be re-constructed remotely in virtually real-time by anyone with a powerful computer, there can be an enormous saving of bandwidth in transmission.

The techniques of this invention are applicable in many areas. For example they are useful in internal medicine for haptic feedback, in railways for the inspection of ties, in production lines for the inspection of finished parts, at security facilities for facial recognition, and especially in forensics. With increasingly fast computers capable of handling vast amounts of data, imaging operations in all these areas can be done in milliseconds.

Figure 1:
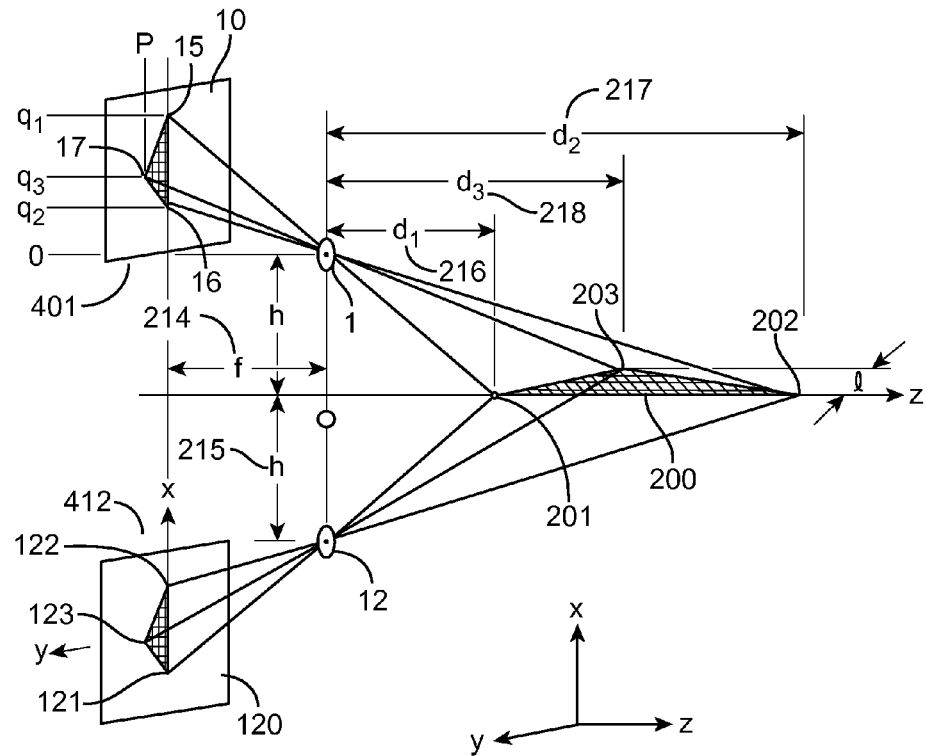
FIG. 1 shows a basic geometrical layout of two detectors for seeing or sensing an object 200, with the parameters of width and length of the object and the corresponding images shown for computation. The detectors, or cameras, are described as an image plane 10 with lens 1, and an adjacent and coplanar image plane 120 with lens 12. The notation is typical for triangulation.

In the discussion which follows the imaging devices will be referred to as cameras, detectors, or nodes, as apt in context. "Detectors" is a more general term, referring to any device capable of perceiving images within the electromagnetic spectrum or sonar range.

DETAILED DESCRIPTION OF THE DRAWINGS

This invention, with its further advantages described below, may be best understood by relating the descriptions below to the drawings appended, wherein like reference numerals identify like elements, and where:

FIG. 1 illustrates how the geometrical parameters of an object, including depth, can be measured using two imaging devices. A first imaging device 401 is defined by a lens 1 and an image plane 10. A second imaging device 412 is defined by a lens 12 and an image plane 120. In the configuration shown the image planes 10 and 120 are coplanar in the x-y plane and lie centered on the x-axis.

In FIG. 1 the imaging devices 401 and 412 are looking at an object, or feature, 200 in 3D space from two different perspectives. In our illustration the feature 200 is shown as a flat object such as a kite (for flying) or a sail (on a boat). The corners 201, 202 and 203 of feature 200 are imaged onto image plane 10 through lens 1 as points 15, 16 and 17. The corners 201, 202 and 203 of feature 200 are imaged onto image plane 120 through lens 12 as points 121, 122 and 123.

Figure 2:
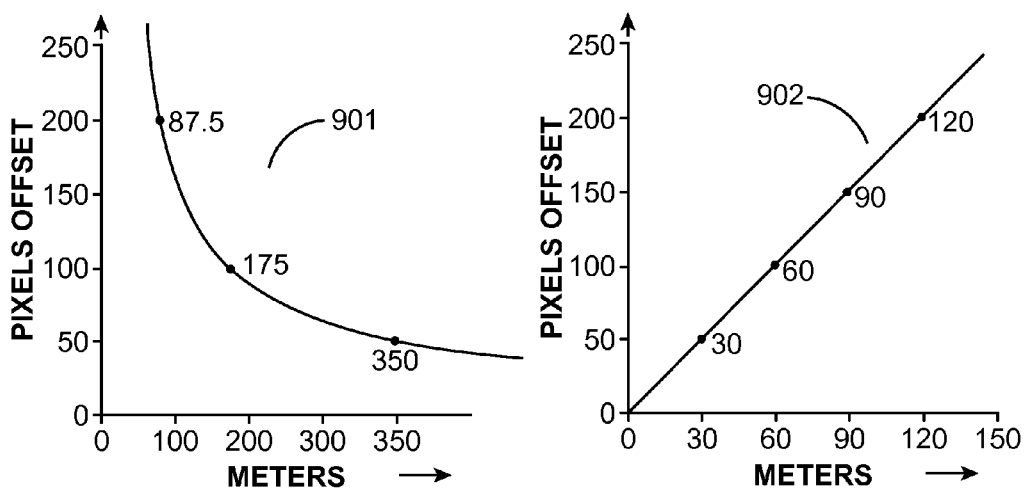
FIG. 2 shows a graphs 901 and 902 the results of using the parameters described in FIG. 1 for computations of length and width in the object 200.

In FIG. 1, given f as the focal length of the imaging devices, or cameras, and +h and −h as the distances of the lenses from the z-axis, we can compute the pixel offsets $q_1$ and $q_2$ corresponding to the distances $d_1$ and $d_2$ to the feature corners 201 and 202, which in this scenario happen to lie along the z-axis. Geometrically $$q_1 d_1 = q_2 d_2 = hf$$

or simply $hf = qd$ where, with the cameras secured and h and f both constant, the variables q and d describe a hyperbolic curve 901 as shown in FIG. 2.

As an example from this curve 901 suppose that f is 35 mm, h is one meter, the detector pixels are 2µ, and there is an image offset q on the image plane of 50 pixels. Then $$d = 35 \times 10^{-3} \times 1/50 \times 2 \times 10^{-6} = 350 \text{ meters}$$

Here d could exemplify the distance from the lenses 1 and 12 along the z-axis to feature corner 202. Correspondingly if on the image the value of q were increased by 8 more pixels then d would become 300 meters, making image 200 larger and bringing feature corner 201 50 meters closer to the detectors.

FIG. 1 also shows offsets from the x-z plane of point p (14) in the +y direction corresponding to a offset l in the −y direction of the feature corner 203. At a specific distance d along the z-axis this creates a linear relationship 902 as shown in FIG. 2

$$p = fl/d$$

As a calculation from this line 902 in FIG. 1 suppose that f is 35 mm, d is a thousand meters, the detector pixels are 2µ, and there is a feature offset of 50 pixels. Then $$l = 50 \times 2 \times 10^{-6} \times 1000 / 35 \times 10^{-3} = 30 \text{ meters}$$

This shows that the calculation of offsets from the z-axis is linear. It is a lot more sensitive than the calculation of distance along the z-axis, especially as distances increase.

A series of lenses in the following discussion (such as 1, 2, 3, ... 12, etc.) will be referred to as "camera centers". It is useful (and conventional) to put the image plane in front of the lenses since, instead of being inverted, the images can be seen to more closely correspond to the objects being studied. For reasons which follow the camera centers will also be abbreviated in the discussion as "nodes".

Figure 3:
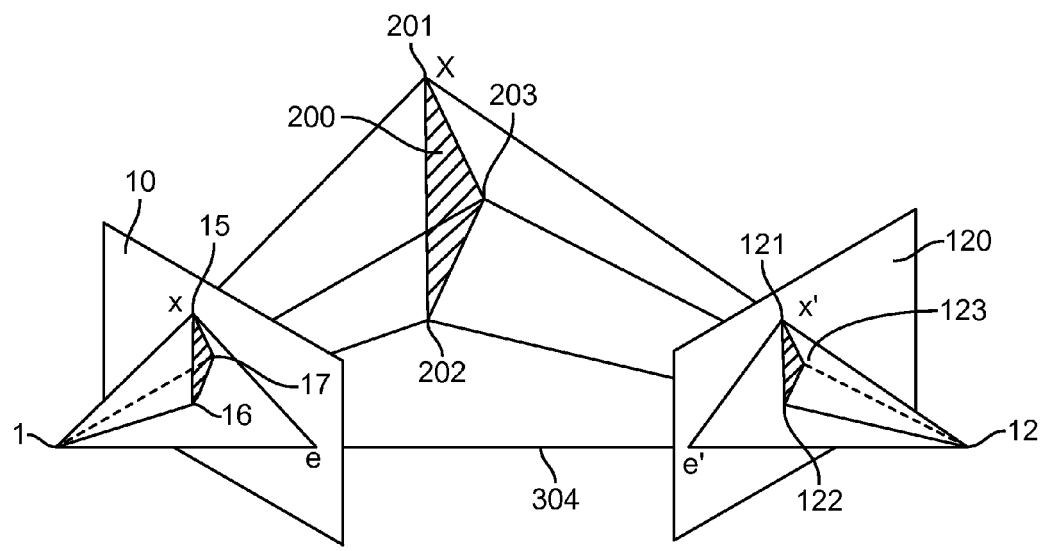
FIG. 3 shows a projection of the object 200 into 3D space, with the image planes 10 and 120 convergent towards object 200, showing images of the object on both planes, and with a baseline 304 connecting the camera centers 1 and 12. (Noted here is the theoretical convention in projection that the lenses 1 and 12 become now the camera centers 1 and 12 with the image planes 10 and 120 inverted towards the object 200, simplifying exegesis.) Where the baseline 304 intersects the image planes 10 and 120 are the epipoles e and e', important in what follows.

In FIG. 3 is shown a projection of the image planes 10 and 120 into 3D space where the lenses 1 and 12 become the camera centers and the points 210, 202 lie on a plane 415. In this figure the image planes 10 and 120 are shown tipped inwards, or convergent, towards the points 201, 202 and 203.

Figure 4:
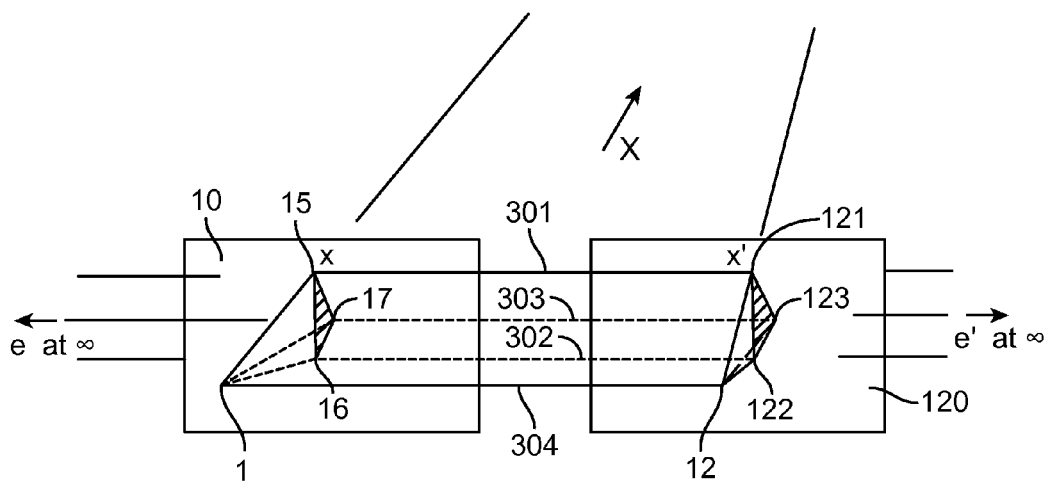
FIG. 4 shows that by projecting the epipoles e and e' to infinity we make the image planes 10 and 120 coplanar, and the lines 301, 302 and 303 joining similar salient features in the two images, such as image corners 15 and 121, are made parallel to the baselines.

In FIG. 4 we project the epipoles e and e' to infinity, thereby making the image planes 10 and 120 in this imaging system coplanar. This projection has the property of making all lines joining similar features parallel to the baseline 304, which is the line joining their two cameras centers 1 and 12. For example the corner 201 of object 200 will project onto detectors 10 and 120 as points 15 and 121 (denoted as x and x') on a line 301. The diagram shows this line parallel to the baseline 304.

Figure 5:
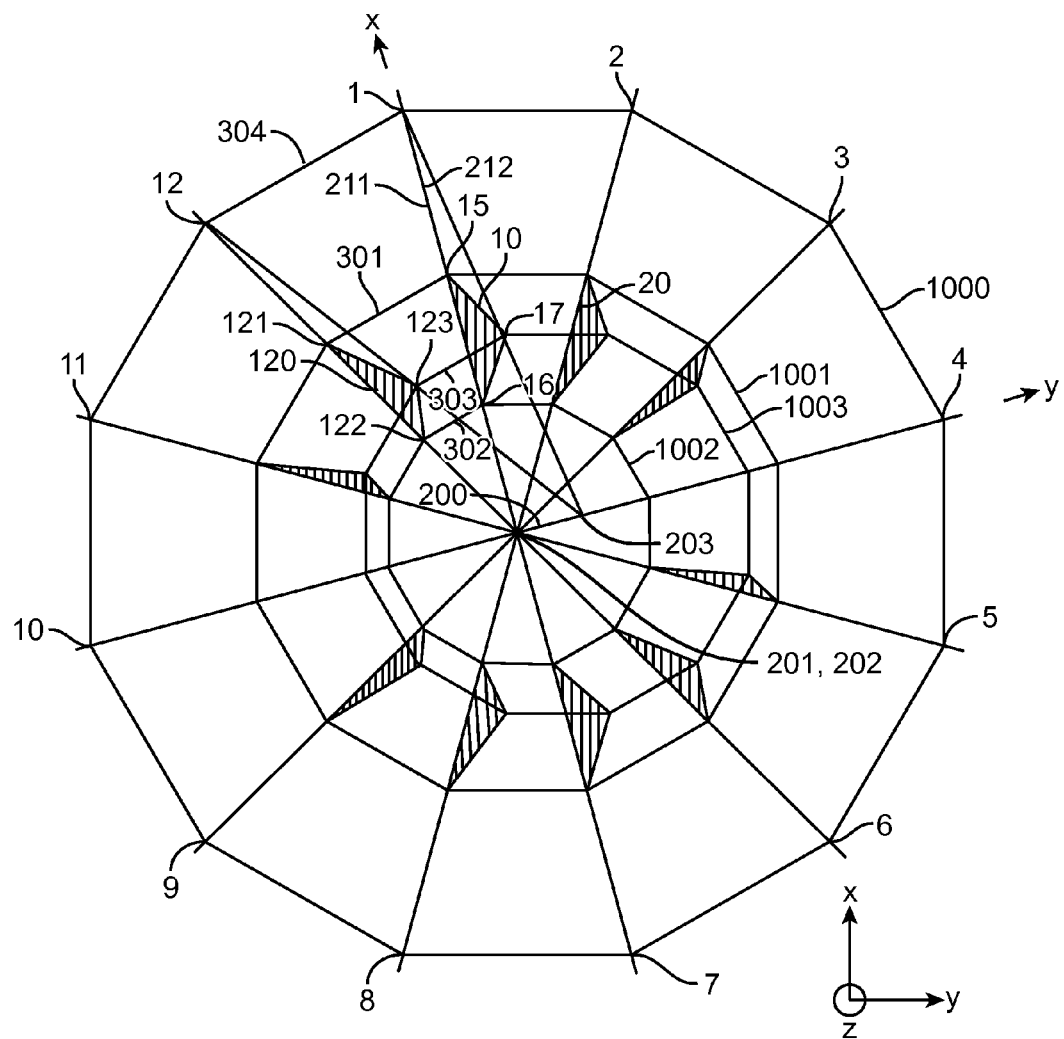
In FIG. 5 this concept is extended to multiple camera centers 1 . . . 12 (described later as "nodes") which for the sake of illustration (and simplicity) we here create as a symmetrical dodecagon 1000. It will be shown later that it can be any shape at all, both planar and non-planar, and that we can derive special relationships from the parallelism of lines on the epipolar pencils.

In FIG. 5 we extend this concept to multiple camera centers (or nodes) 1, 2, 3 ... 10, 11, 12, etc. For the sake of illustration (and simplicity) we may make this shape a symmetrical dodecagon. It will be shown later that it can be any shape at all, and can be extended to non-coplanar detectors.

Figure 6:
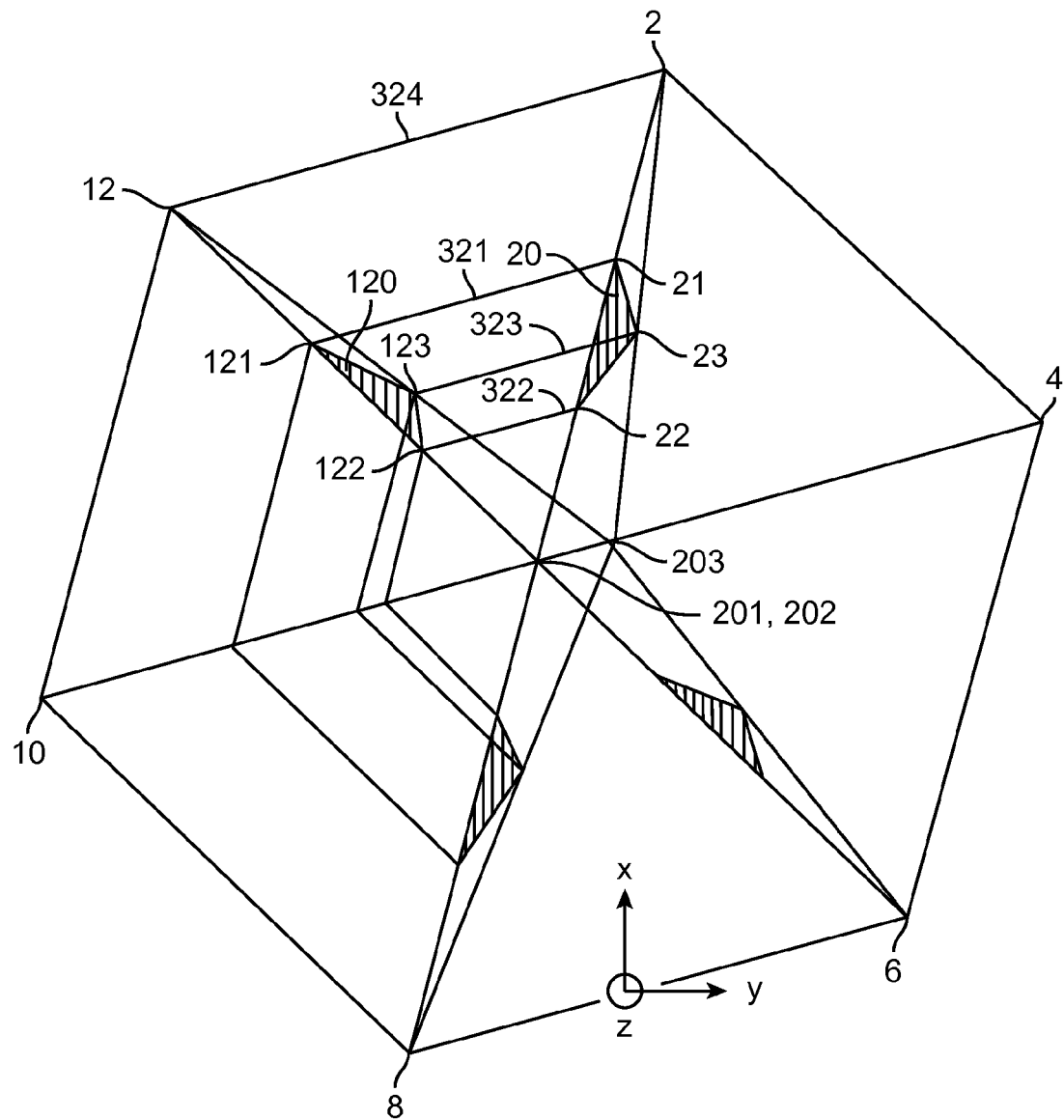
In FIG. 6 is shown how "missing" cameras affect imaging. We have eliminated cameras at alternating nodes (such as 1, 3 and 5) leaving a hexagon of even numbered nodes (such as 2, 4, 6). Note here that an image 20 constructed with a reduced camera set (6) for node 2 is exactly the same as it is for a full camera set (12). This is to indicate how working with a "skeleton" can be effective. Later we will show that skeletons can be of any shape.

In FIG. 6 we show how "missing" cameras affect imaging. We have eliminated cameras at alternate nodes 1, 3, 5, 7, 9 and 11—six in all, leaving a hexagon of 2, 4, 6, 8, 10, 12 nodes as the remainder. By connecting new baselines such as 324 between nodes 12 and 2, all similar features 21 and 121, 22 and 122, etc. are connected by parallel lines 321 and 322, etc. since the epipoles of image planes 20 and 120 (and others) are all at infinity.

This has the property that no matter how the baselines are connected between any pair of nodes, the images created on those image planes by any set of lines parallel to the baselines are identical. In other words, the image formed by the corners 121, 122, 123 on image plane 120 permutes identically to itself no matter how that image plane is connected to other coordinated image planes on the field.

A missing or unusable imaging device make no difference for imaging in remaining real (or imaginary) imaging devices since using epipolar lines these can be linked seamlessly to alternate imaging devices in the field.

This property has huge ramifications in terms of redundancy. The number of apexes which can be connected in pairs in any field of n coordinated detectors is n (n−1)/2. This means that 12 detectors (as in FIG. 5) can be connected together 66 different ways. Losing half these detectors by mishap or sabotage (as in FIG. 6), thereby reducing the number to 6, still allows 15 different combinations, which is statistically significant, and in fact adequate, for many purposes.

Figure 7:
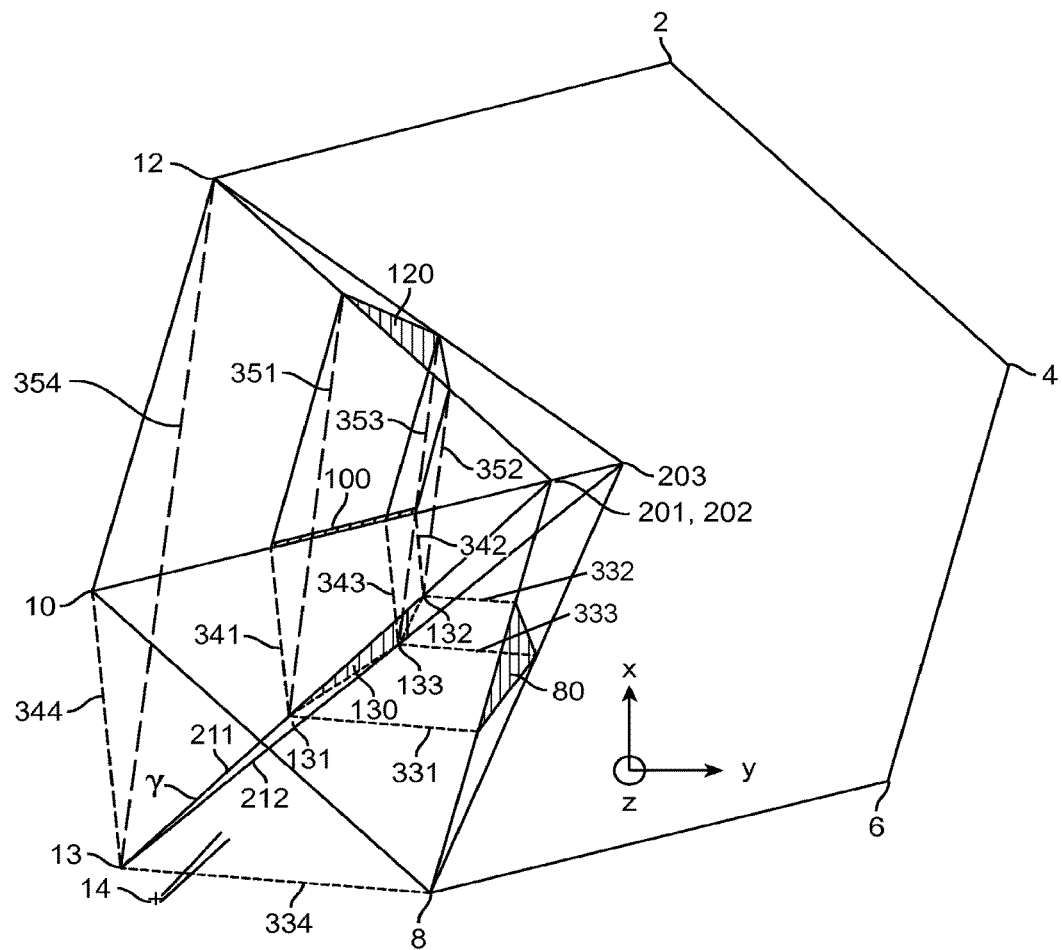
FIG. 7 shows how an imaginary camera 13, located randomly, can be made to perform as a real camera within a skeleton (a polygon) formed by other camera centers.

In FIG. 7 is shown the ability to place artificial cameras 13 and 14 in places where none existed before, and have them function like normal cameras. We will cover this later.

Figure 10:
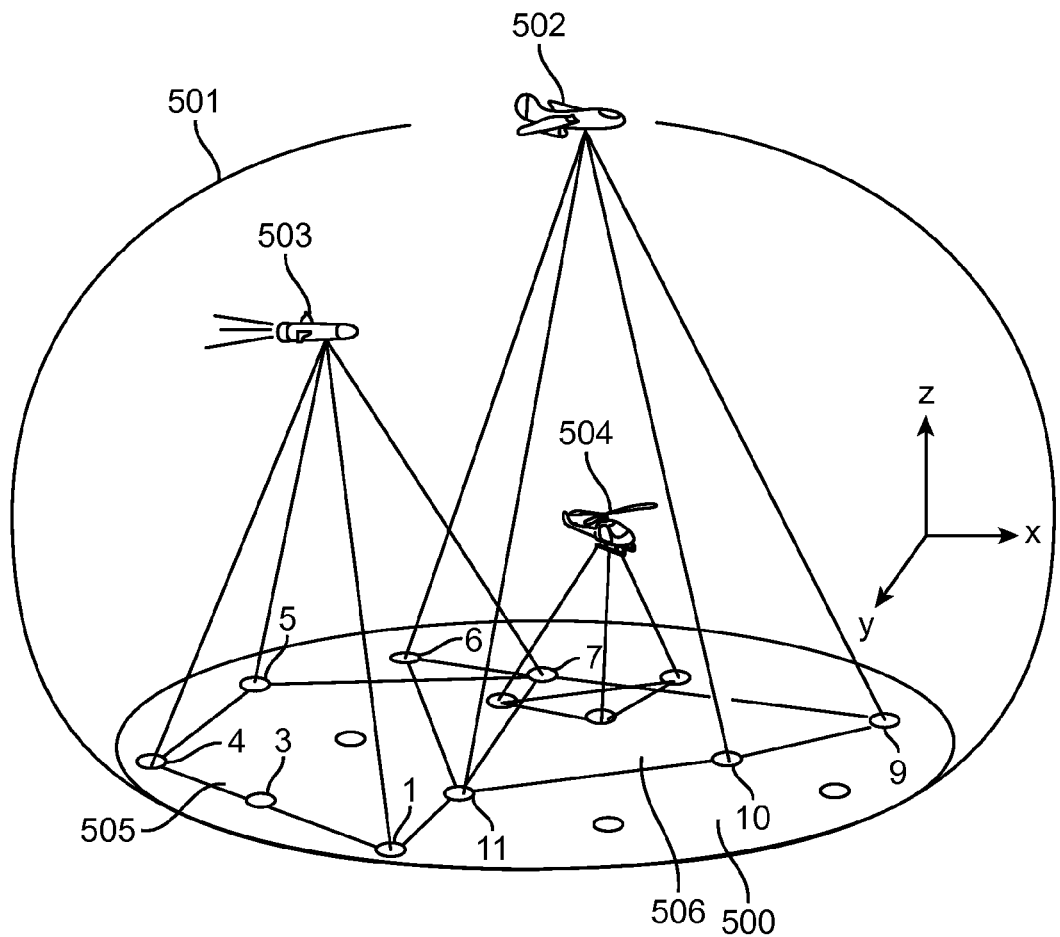

Anticipating FIG. 10, we show a field of coordinated detectors 500. This field may contain many detectors—perhaps a thousand or more for missile tracking, aircraft navigation, drones, etc. The possible number of different pair combinations for 1,000 detectors is n (n−1)/2 which equals 499,500—nearly half a million. This implies that any select few—perhaps a dozen detectors, may be chosen for progressive tracking at one time. The tracking of multiple targets can overlap and proceed simultaneously. With massively parallel architecture and instantaneous fault detection should any detector fail (or get blown up in wartime) the system has multiple redundant detectors and resilience to spare. It can be programmed to continue seamlessly.

Issues remain: (i) The epipoles are prescribed as being at infinity, but how must the cameras (or detectors) be coordinated? (iii) how does one go beyond infinity with the epipoles if the cameras are neither convergent nor coplanar?

We first address issue (i): How do we coordinate cameras? and why ? (i) We coordinate cameras to reduce computation. Part of this can be achieved—though shown later as not strictly necessary—by acquiring a single model camera from a given manufacturer. (ii) When the cameras are coplanar and coordinated failure of any particular camera is not an issue; the computer can sense failure in microseconds; massive redundancy permits object detection to be switched to other selected cameras.

To get cameras coplanar with their epipoles projected at infinity we need (progressively) primary, secondary and fine alignment.

For camera pairs we can enumerate certain physical degrees of freedom—focal length, aperture, zoom, x, y and z, and pitch, roll and yaw. All degrees of freedom must then be adjusted together so that cameras as pairs and en masse match each other as closely as possible. As examples, the pose of the cameras, i.e. their axes, should be parallel; apertures also should be adjusted to give matching light intensity on the detectors, etc.

Primary. Assuming cameras are facing skywards and connected in parallel (as they should be), they may be trained on a distant object (a star overhead), and aligned one by one so that their images coincide (as precisely as possible by eye) on a computer screen nearby. This will make them parallel but will not fix image size and rotation, which follows.

Secondary. A simple recipe for bringing the images from each pair of cameras into close parallel, rotation and size correspondence can be performed in Matlab. It depends on accurately choosing (at least two) matching features in distant images. This could be pinpoints such as two well-separated and well-known stars. The median (estimated) pixel positions must be delivered to the program below into the two functions ginput2( ) by the user.

The matching algorithms below we use the local coordinates of the detectors (rather than the global coordinates discussed later for image mapping). That is, that when our alignments are carried out to a sufficient degree point $(x_i, y_i)$, of image plane 10 will correspond (almost) exactly to point $(x_i, y_i)$ of image plane 120.

```
alignment.m
% load input images
l1=double(imread('left.jpg'));
[h1 w1 d1]=size(l1);
l2=double(imread('right.jpg'));
[h2 w2 d2]=size(l2);
% show input images and prompt for correspondences
figure; subplot(1,2,1); image(l1/255); axis image; hold on;
title('first input image');
[X1 Y1]=ginput2(2); % get two points from the user
subplot(1,2,2); image(l2/255); axis image; hold on;
title('second input image');
[X2 Y2]=ginput2(2); % get two points from the user
% estimate parameter vector (t)
Z=[X2' Y2'; Y2' -X2'; 1 1 0 0; 0 0 1 1]';
xp=[X1; Y1];
t=Z\xp; % solve the linear system
a=t(1); %=s cos(alpha)
b=t(2); %=s sin(alpha)
tx=t(3);
ty=t(4);
% construct transformation matrix (T)
T=[a b tx; -b a ty; 0 0 1];
% warp incoming corners to determine the size of the
    output image (in to out)
cp=T*[1 1 w2 w2; 1 h2 1 h2; 1 1 1 1];
Xpr=min([cp(1,:)0]):max([cp(1,:)w1]); % min x:max x
Ypr=min([cp(2,:)0]):max([cp(2,:)h1]); % min y:max y
[Xp,Yp]=ndgrid(Xpr,Ypr);
[wp hp]=size(Xp); %=size(Yp)
% do backwards transform (from out to in)
X=T\[Xp(:) Yp(:) ones(wp*hp,1)]'; % warp
% re-sample pixel values with bilinear interpolation
clear Ip;
xI=reshape(X(1,:),wp,hp)';
yI=reshape(X(2,:),wp,hp)';
Ip(:,:,1)=interp2(I2(:,:,1), xI, yI, '*bilinear'); % red
Ip(:,:,2)=interp2(I2(:,:,2), xI, yI, '*bilinear'); % green
Ip(:,:,3)=interp2(I2(:,:,3), xI, yI, '*bilinear'); % blue
% offset and copy original image into the warped image
offset=-round([min([cp(1,:)0])min([cp(2,:)0])]);
Ip(1+offset(2):h1+offset(2),1+offset(1):w1+offset(1),:)=
    double(l1(1:h1,1:w1,:));
% show the results
figure; image(Ip/255); axis image;
title('aligned images');
```

We can write a more general program in Matlab to bring multiple images within a few pixels of alignment, and consequently make multiple image planes parallel simultaneously.

Fine alignment. To get accurate alignment in a terrestrial environment we must delve into a "feature-based" approach. In general, for feature selection, any of a number of edge detection algorithms can be used, such as: J. Canny, "A Computational Approach to Edge Detection," *IEEE Transactions on Pattern Analysis and Machine Intelligence*, Vol. PAMI-8, No. 6, 1986, pp. 679-698). We can apply this to features we have already chosen, using the local coordinates of image planes 10 and 120.

Using a notation common in imaging (See Richard Szeliski, December 2006), we may utilize the minimum of the sum of squares function $E_{SSD}(u)$ for our step-wise correlation of similar features on image planes 10, 20, 30 . . . 120, etc.:

$$E_{SSD}(u) = \Sigma_i [I_1(x_i+u) - I_0(x_i)]^2 = \Sigma_i (ei)^2$$

Where $u=(u, v)$ is the feature displacement on orthogonal axes (using local coordinates) and $ei = I_1(x_i+u) - I_0(x_i)$ is the error function or feature displacement offset within the feature areas ($I_0$ being the reference feature on image plane 10 and $I_1$ a similar feature on image plane 20, etc.)

That is, we reduce all the errors ei to an acceptable minimum, realizing that because the images are taken from different perspectives, the errors ei will never be completely zero.

The sum of squared differences function $E_{SSD}(u)$ above can also be written as a Fourier transform:

$$F\{E_{SSD}(u)\} = F\{\Sigma_i [I_1(xi+u) - I_0(xi)]^2\} = \delta_{(f)} \Sigma_i [I_1^2(xi) + I_0^2(xi)] - 2I_0(f) I_1^*(f)$$

The right-hand expression shows how $E_{SSD}(u)$ can be computed by subtracting twice the correlation function (the last term) from the sum of the energies of the two images (the first term). We can use the discrete cosine transform, DCT-2, if we want to correlate larger pixel areas.

For really fine correlation we can use a partial differential equation to compare the image gradients at the light-to-dark edges of our chosen features on image planes 10 and 120. We can treat the least squares function $E_{SSD}(u)$ above as an energy function with a hypothetical displacement $\Delta u$ $$E_{SSD}(u+\Delta u) = \Sigma_i [I_1(x_i+u+\Delta u) - I_0(x_i)]^2 = \Sigma_i [J_1(x_i+u) \Delta u + (ei)]^2$$

where the Jacobian $J_1(x_i+u) = \nabla I_1(x_i+u) = (\partial I_1/\partial x, \partial I_1/\partial y)(x_i+u)$ is the image gradient at $(x_i+u)$ and $ei = I_1(x_i+u) - I_0(x_i)$ is the intensity error (as above).

This is a soluble least squares problem in which sub-pixel resolution can be achieved when the Jacobians of the profiles of the two features 141 and 142 are approximately equal $$J_1(x_i+u) \approx J_0(x)$$

since near the correct alignment the appearance of light-to-dark edges should be the same.

This alignment of x and y coordinates will bring the two image planes 10 and 120 onto almost identical points $(x_i, y_i)$ on their local x-y planes, differing only by their global offsets +h and -h from the z-axis, as in FIG. 1. This alignment will apply sequentially to all image planes 10, 20, 30 . . . up to 120 and beyond.

With the cameras aligned and secured in their locations we can estimate with fair precision variations in the geometry, recognition and motion of distant objects.

Of interest to us is that the distance h from baseline to detectors could be quite large—say a hundred meters—making the range accurate at 35,000 meters. In addition the separation of pixels could be accurately gauged at ±1 (or less), making the accuracy for 100 meter detector separation 50 times greater again, at 1.7 million meters. More then will depend on camera resolution.

A reflection is prompted about the resolution by an observation satellite of asteroid trajectories near earth, especially if there is an effort to divert an asteroid on collision course. Free from gravity and atmospheric turbulence, cameras could be deployed far from the satellite. From the calculations above, the range of such cameras 1 km apart would be 170,000 kilometers, giving ten hours warning for an asteroid approaching at 17,000 km per hour.

A sum of such images and measurements taken with many cameras will provide a many faceted picture of an object, as may be seen in the shaded areas of FIG. 5. With increasing facets the ability for software to recognize the unique character of an object will steadily improve. Bayesian probabilities will adduce certainty to recognition.

We have not mentioned the additional parameters of color, hue, saturation, light, dark etc., in objects as a means of recognition. This will come later.

FIG. 5 shows an array of coplanar detectors 1 to 12 arranged symmetrically around an object 200 lying along a central z-axis between detectors 1 to 12. For ease of visualization we make the z-axis look into the paper. The object 200 in FIG. 5 is the same object 200 as in FIG. 1, where the central corners 201 and 202 lie on the z-axis, and the corner 203 lies to one side on the y-axis.

In FIG. 5 the construction lines 211 and 212 connect camera center 1 with the corners 201, 202 and 203. The line 211 is shown as single as points 201 and 202 lie coincident on the z-axis.

Referring back to FIG. 1, we can transfer the same parameters of length d and pixel offsets q, etc. to the more general FIG. 5. On image plane 10 the pixel distance $q_1$ from camera center 1 is plotted as point 15. Similarly the pixel distance $q_2$ is plotted as point 16, and the pixel distance $q_3$ and offset p on the y-axis is plotted as point 17. We proceed in a similar manner for all detectors 1 to 12.

Because we have arranged it so that epipoles of all these detectors are at infinity, the corners of all these plots form in aggregate nested dodecagons 1000 (baselines), 1001 (points similar to 15), 1002 (points similar to 16) and 1003 (points similar to 17). These lines together form nested sets with parallel sides as shown in FIG. 5.

We can observe from FIG. 1 that the object point 202 furthest away from camera center 1 creates the smallest pixel shift $q_2$ on image plane 10, at point 16. Therefore the aggregate of images of point 202 on all image planes 10, 20, ... up to 120, at points 16, 22 ... up to 122, form the smallest dodecagon 1002 in FIG. 5.

Similarly from FIG. 1 the object point 201 nearest from camera center 1 creates the largest pixel shift $q_1$ on image plane 10, at point 15. Therefore the aggregate of images of point 201 on all image planes 10, 20 ... up to 120, at points 16, 22 ... up to 122, form the larger dodecagon 1001 in FIG. 5.

Again in FIG. 1, the object point 203 intermediate from camera center 1 creates an intermediate pixel shift $q_3$, and an additional pixel offset p in the y-direction, on image plane 10, at point 17. Therefore the aggregate of images of point 203 on all image planes 10, 20 ... up to 120, at points 17, 23 ... up to 123, form an intermediate dodecagon, offset by an amount corresponding to this pixel offset p, as dodecagon 1003 in FIG. 5.

We note that the size of these dodecagons obey the hyperbolic curve 901 in FIG. 2. While an object feature 202 (the nose of a missile) is far away from detectors 1 ... 12 a dodecagon will appear small (as dodecagon 1002). While object feature 201 (the nose the same missile) is closer to detectors 1 ... 12 a dodecagon will appear larger (as dodecagon 1001).

We also note the effect of an object feature 203 (the nose of our approaching missile) going off course on the y-axis. This is shown as dodecagon 1003, which is now eccentric. The size of this dodecagon will still obey the hyperbolic curve 901 in FIG. 2. But in eccentricity the dodecagon will obey the linear curve 902 in FIG. 2. The missile (as we have named object 200), will in fact track as a dodecagon in a manner combining curves 901 and 902 from FIG. 2.

Because curve 901 in FIG. 2 is hyperbolic, should a missile actually hit the detectors the size of the tracking dodecagon would become infinite.

The usefulness of this construction—of which we have given just one example—may now be made apparent.

The first is visualization. Through multiple views and with n(n−1)/2 comparisons, Bayesian probabilities can rapidly help confirm an identity. This is important, since images can become indistinct, go behind clouds, etc.

Another is velocity. Suppose point 202 represents the nose of our missile coming directly up the z-axis centerline towards the cameras. At moment $t_1$ it could be at 202. At moment $t_2$ it could be at 201. As prior calculations show the separation (as resolved by the detectors) could be 50 meters. Given an approach velocity of 600 km/hr. the time difference $t_2-t_1$ would be 3 seconds. At 350 meters away in the calculations above, this would give a reaction time of just 21 seconds.

To gain time we may propose a change in length of the baseline h between cameras. If h is changed from one meter to ten, the reaction time will become 210 seconds—three and a half minutes. If h is changed from one meter to one hundred, the reaction time will become 2,100 seconds—thirty-five minutes. Multiple coordinated high resolution cameras with broader baselines will allow greater warning time for reaction.

The addition of many viewpoints beyond 2D not only replicates the vision of the human eye to perceive depth from diverse points of view, but adds valuable information for the inspection of diverse objects. These objects can be instantaneously compared and sorted against three-dimensional templates which may reflect the ideal for that particular object. With advanced object recognition software, inspection and ranging can be done at high speed and with great accuracy.

We now address issue (ii): An epipole of a camera imaging on a flat plane must make its z-axis either parallel to, or convergent with, all others, else its epipole will either be imaginary or beyond infinity.

A solution to this dilemma is to project a curved image field in front of the lens to simulate a fish-eye lens or a human eyeball. The epipole will then fall on a spherical surface, real or imagined, surrounding the camera center.

Figure 9:
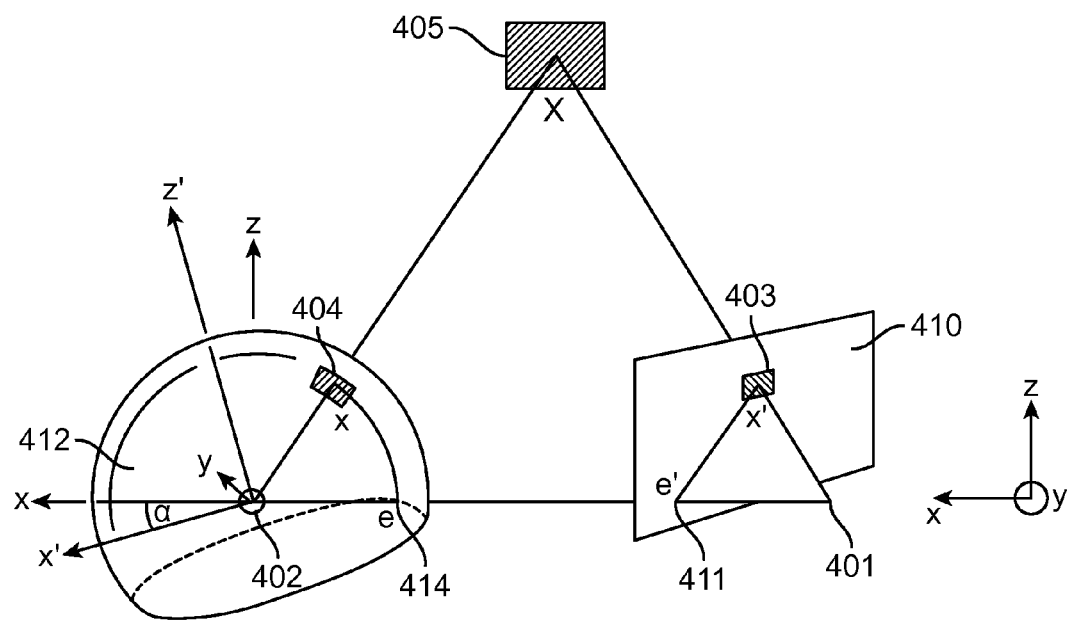
In FIG. 9 illustrates how a point X can project onto two different coordinate systems, but whose images can still be related through various coordinate transformations In FIG. 10 shows a visual range horopter 501 of all the coordinated detectors 500 in a detector bundle, as will be described below.

This solution is shown in FIG. 9, where a line 406 joining camera centers 401 and 402 has epipoles e' passing through a flat plane 410 and e passing through a sphere 412. The pose of this camera with center 402 is on the z'-axis. The spherical configuration here makes the pose immaterial, since within a sphere there is always one radius which will fall parallel to the z-axes of all other detectors. The sphere can be partial or otherwise, so long as the shape in general is curved. Having z-axes parallel for all cameras is not only necessary but desirable for simplifying calculations.

In FIG. 9 we can choose a z-axis (north, polar) 407 as corresponding to the pose of all other cameras. Using FIG. 8, we convert spherical (polar) coordinates of point 404 (ρ, φ, θ) into (x, y, z) coordinates. This makes images consistent with those from all other cameras. Our new coordinates are:

(x, y, z)=ρ(sin φ cos θ, sin φ sin θ, cos φ)

where ρ (rho) is the radius of sphere 412. ρ may also be used as a scaling factor.

Figure 8:
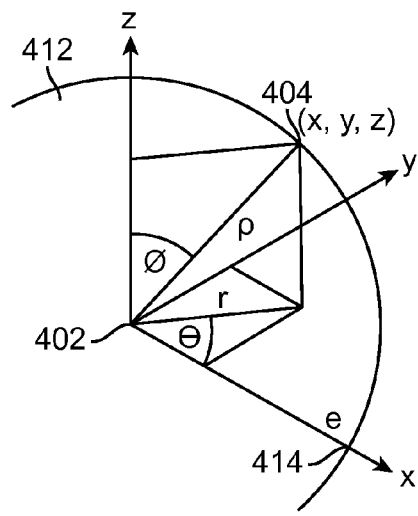
FIG. 8 shows the parameters of a polar coordinate system. This is to show how polar geometry can relate to outlying cameras which fall off our usual definition of coplanar.

In FIG. 9 any image on a sphere will have barrel distortion and this must be corrected from image 404 so that it will correspond point by point to flat image 403. The following factors will make correspondence easier by virtually eliminating this distortion, producing new coordinates $x^a$ and $y^a$:

$$x^a = x(1+k_1 r^2 + k_2 r^4)$$

$$y^a = y(1+k_1 r^2 + k_2 r^4)$$

where $k_1$ and $k_2$ are radial distortion parameters and $r^2 = x^2 + y^2$. r is a variable radius diminishing according to its distance up the z-axis as in FIG. 8. Higher order parameters (e.g. $k_3 r^6$) may be necessary for even more matching towards the poles.

For both Cartesian and Polar coordinate systems we need a way to relate images between planes 10, 20, 30, ... n, between spheres such as 412, and between the two imaging systems. We need to compare a matrix M describing an array of pixels $x_1 \ldots x_n$, $y_1 \ldots y_n$ to a matrix M' describing a similar array of pixels $x_1' \ldots x_n'$, $y_1' \ldots y_n'$. In other words we need a transformation matrix T where M'=M.T Using homogeneous coordinates relating images on flat surfaces this appears as:

$$\begin{pmatrix} x' \\ y' \\ 1 \end{pmatrix} = \begin{pmatrix} x & y & 1 & 0 & 0 \\ y & -x & 0 & 1 & 0 \\ 0 & 0 & 0 & 0 & 1 \end{pmatrix} \cdot \begin{pmatrix} s\cos\alpha \\ s\sin\alpha \\ t_x \\ t_y \\ 1 \end{pmatrix}$$

where s is a scaling factor to exactly match image sizes, $t_x$ and $t_y$ the pixel displacement for precisely corresponding images on their local image planes, and x' and y' are the local pixel arrays for the newly coordinated images. α is the angle of rotation, programmed in radians, normally zero if detectors are properly coordinated.

A similar expression will occur above when the x and y pixel arrays above are replaced with their corresponding polar (spherical) coordinates as in FIG. 8 and are properly scaled.

Possibilities arise for a field of cameras where all cameras are spherical, all have their z-axes parallel, and all are scaled through their radii p to match each other. In this case all images would be similar and would be coordinated closely as spherical images.

We note that cameras which are not strictly coplanar, or fall out of line with others, can be re-aligned with others through projective transformations, as may be occasionally needed.

An essential point in the present invention is that a planar structure, as in FIG. 5, appears as a practical means for coordinating and making operative a multitude of detectors. The transformations for new points of view require no rotation or projection, only affine transformations, which make for a simple and robust way to achieve high-speed performance for recognition and tracking.

An important ramification of this invention is that with a supporting structure as in FIG. 6 images can be constructed where none existed before. Cameras can be posited usefully in imaginary places and pictures can be created as though the cameras are actually there. This is shown in the dotted lines of FIG. 7 where an image is created based on parallel epipolar lines from adjacent images. In fact whole scenes can be constructed given a handful of nearby camera images.

In FIG. 7 we posit an imaginary camera with center 13 as shown. From center 13 we run lines to adjacent camera centers—line 334 to center 8, line 344 to center 10, and line 354 to center 12. Precisely parallel to these lines we run lines 351, 352 and 353 from the corners of image 120; we run lines 341, 342 and 343 from the corners of image 100; and we run lines 331, 332 and 333 from the corners of image 80. These lines intersect precisely on lines 211 and 212 to form the corners 131, 132 and 133 of a new image 130. This is now a perspective view of object 200 from a camera with center 13.

To create a 3D view of object 200 from the same distance we can posit another imaginary camera with adjacent center 14, subtend an angle suitable for 3D at object 200, and iterate a series of lines as above. This will give us an image (not shown) precisely cognate with image 130 for a full 3D perspective view of object 200.

An explanation is at hand. It lies (i) in our ability to line cameras up precisely, as described above (the practical difference between precise and not precise to image quality is like daylight to night) and (ii) on the transformation M'=TM where T is an affine transformation on the x-y plane. The image 130 will be stretched along the line 211 by the ratio R'/R of the distances from the object 200 to the camera centers 13 and 12. The image 130 will be compressed against line 212 by tan γ, where γ is the angle subtended by the object 200 between lines 211 and 212. The stretching and compression is automatic from the geometry. There is no rotation since all the cameras will have been rotated precisely prior to adding nodes 13 and 14.

To explain further: In FIG. 5, FIG. 6 and FIG. 7, R represents how far a typical image plane 80 (containing the aggregate pixels M) is from a common center line, a z-axis, of a group of image planes 10 ... 120. R' represents how far the image plane 130 (containing the aggregate pixels M') may be from this z-axis. By changing the ratio R'/R we can make the image 130 zoom larger or smaller, creating far and near perspectives at will.

This can be done by a computer with an imaginary camera 130 with no physical change to other cameras. Better yet, a pair of cameras 130 and 140 can create real 3D perspectives with real images borrowed from real cameras with transformations like M'=TM above.

The images 130 and 140, as in all images, can be normalized with others by inverting the ratio R'/R, to bring all images into conformity of scale.

The ability of creating 3D as with nodes 13 and 14 opens up many possibilities. For example, a whole family of 3D perspectives with imaginary cameras can be created around a few actual key viewpoints. Also, a pair of nodes such as 13 and 14 can be moved around in virtually real time to obtain almost any perspective. Again, the separation of nodes 13 and 14 can be enlarged and reduced; enlarging increases the discrimination of objects in 3D.

Transmission speeds (as in the MPEG-4, -5 and -6 series for video) will be increased by orders of magnitude through our ability to construct whole scenes from a few camera images. In this scenario cameras are only windows: the real visual processing will be done by powerful computers at the receiving end. Pan, tilt, zoom—seeing scenes from different perspectives—will be done remotely in virtually real-time by the recipient.

Finally, using a stabilizing program (described elsewhere by this inventor and others, and using Newton's laws of motion) the persistence of a scene can be continued as though actually happening for some time (i.e. seconds, or perhaps half a minute) after all cameras are blown up. Even a destroyed scene itself could be constructed to continue hypothetically for a similar period.

To a large degree certain transformations have already fixed the parameters of shape at hypothetical camera locations. What needs discussing are the additional parameters of color, hue, saturation, light, dark, etc. In hypothetical locations these can be inferred—for example, green should continue as green in saturation and hue, though it may be darkened by shadow.

The parameters above may be inferred as a weighted average from the corresponding local images. From two adjacent images having corresponding pixels with different shades of green, a new color image could be created by summing and averaging, creating a shade in the middle. Largely, this may be adequate.

For a projection system requiring multiple viewpoints, as exist for immersive 3D viewing, the conversion of a handful of coordinated cameras views, such as twelve, into multiple authentic viewpoints, such as two hundred, could be most valuable. This would be useful for both large and small glasses-free 3D screens.

An opportunity exists to create real reality, as opposed to augmented reality, for popular items such as Oculus Rift and Google Cardboard. This can be done in very nearly real-time with simple transformations using the power of a modern cell-phone snapped into a slot behind the viewer. Football games could be watched on these devices in 3D in real-time in detail.

In many scenarios time is limited, so the need for recognition with high probability is critical. Multiple offset cameras with many viewpoints, as in this invention, can increase probability; the computer can continuously cross-correlate information from several cameras, to verify details; the use of image stabilization, continuity and priors corroborates probabilities and aids identification.

The possibilities described above could be of great value to forensic work.

To summarize: What we have shown is a method using epipolar lines and matrix transformations to create viewpoints for which no imaging devices exist with these following steps: (i) precisely aligning multiple imaging devices; (ii) making imaging devices coplanar by projecting imaging device epipoles to infinity; (iii) positing coplanar imaginary imaging devices as and where needed; (iv) linking camera centers of imaginary imaging devices to camera centers of existing imaging devices with baselines; (v) running epipolar lines precisely parallel to baselines from key features of existing imaging devices to precisely intersect at hypothetical key features of imaginary imaging devices; (vi) using matrix transformations to bring real images from imaging devices to precisely align at hypothetical key features of imaginary imaging devices.

What we have shown in this invention is that an efficient and exact—and therefore fast—way of creating wholly new real images from adjacent real images, which allows us to solve real-world imaging problems by creating as many nearby viewpoints as necessary chosen at will.

FIG. 10 shows a field 500 of multiple coordinated detectors ("nodes") 1, 2, 3 . . . n. There can be any number of nodes in such a field. A number of nodes (conveniently 12) can be assembled temporarily as irregular polygons which we call "tracking skeletons"—because out of a field of many detectors they might represent a "bare bones" minimum for effective tracking Examples given here are (i) a skeleton 505 consisting of nodes 1, 3, 4, 5 and 7 for tracking a missile 503, which skeleton could mutate rapidly upstream to higher numbered nodes such as 11, 12, etc. depending on the velocity of the missile; (ii) skeleton 506 consisting of nodes 6, 7, 9, 10, 11 for tracking an aircraft 502; (iii) another skeleton (unnumbered) for tracking a drone 504, expecting the last skeleton to mutate slowly for a slow drone.

In FIG. 10 the volume 501 also describes an ellipsoid horopter, loosely enveloping the limits of visual perception of a system of detectors—or of our eyes. This horopter may be loosely defined as "a curve of the limits of visual acuity", or further defined as "a limit to the ability of any two detectors to see an object in 3D". We may pick an angle—say 1°—for that limit, selected (arbitrarily) because smaller than that we cannot easily distinguish objects in 3D. This limit is defined as the angle subtended by an object at a particular height between two ranging detectors. For a human being this would be 12.5 feet. Distinguishing objects at 60 miles would take a pair of detectors separated by a mile.

The horopter 501 would also have its limits defined by the size of its base 500 (which is nodes), the maximum limit of 3D discrimination, and the distance apart of its detectors for effective tracking There could be multiple fields like 500 for long-distance tracking, for example twenty-five across the width of the United States, each accounting for a hundred-mile extent.

The size of the horopter 501 would depend on the objects being tracked and their altitude. For drones 504 flying at five hundred feet the horopter envelope could be a few hundred feet high, using detectors ten feet apart. For aircraft 502 cruising at 60,000 feet the horopter envelope could be twelve miles high, with detectors 1000 feet apart. Detection of both planes and drones could be combined in the same field, a rough diameter of the skeletons for each being commensurate with their targets' altitudes.

The extent of the horopter would also depend critically on an anticipated threat. In one scenario a missile might be approaching at 600 miles an hour. Detectors a mile apart would recognize it 6 minutes away. It might be better to allow double the minutes for response with detectors twice the distance apart, implying a horopter twice as large.

Figure 11:
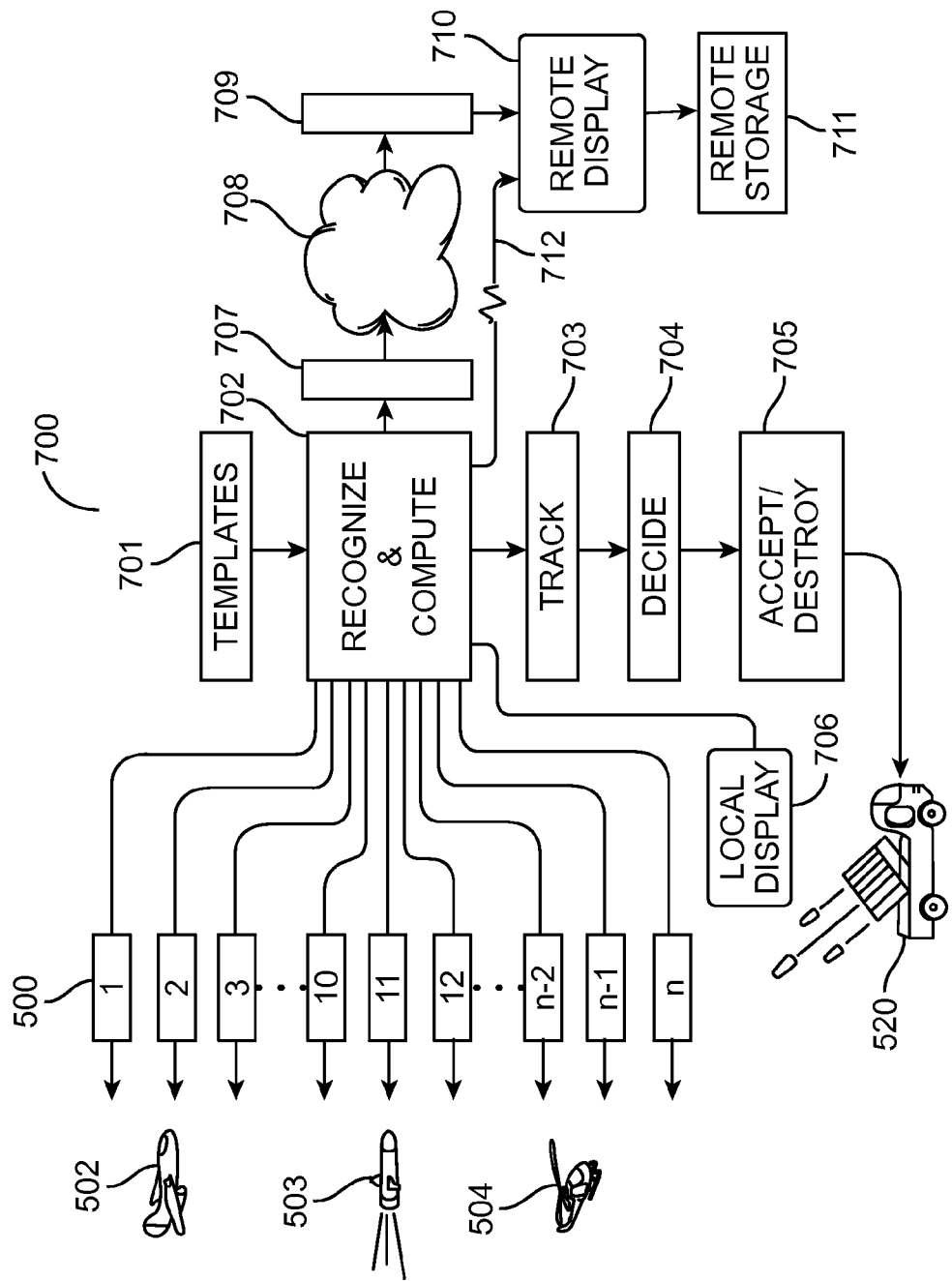
FIG. 11 shows a possible way of processing the data gathered by cameras 1, 2, 3 . . . n. For redundancy (in case any lose function) a parallel configuration of cameras is preferred. When an object (such as an aircraft) is recognized by the computer, a select few cameras as in 1, 2, 3 . . . etc. can be chosen to track it, depending on the object's range.

FIG. 11 illustrates a system 700 for collecting and processing signals from a field 500 of detectors 1, 2, 3, . . . n, as in FIG. 10. When motion is picked up by these skyward-facing detectors, the signals are fed in parallel to a computer 702. Altitude and trajectory can be swiftly calculated, as already noted. A nearby database 701 can be consulted for eidetic correspondences. With correspondence and trajectory confirmed (703) a decision can be made (704) whether to accept the object (502, 503, or 504) as harmless or to destroy it (705) with a lethal weapon (520).

As shown in Iron Dome with a similar configuration, the recent availability of ultra-high-speed processors allows the computation of highly complex data in speeds approaching real-time. With fast image recognition algorithms and high-speed software, 3D ranging can be done in milliseconds. This allows equally fast (and automated) response to incoming missiles threatening major institutions in cities like New York or Washington—all the while the missiles being unaware that they being tracked and therefore less capable of taking evasive or jamming action.

Iron Dome uses radar, it is active. The system 500-700 is passive, with massively parallel redundant architecture, spread over large areas with inexpensive optics, capable of using a computer the size of a cell-phone, capable of multiple replication, and much harder to incapacitate.

The system portion 700 can also transmit data through the net, via satellite or on dedicated underground fiber-optics for immediate display or for storage.

The computer 702 in FIG. 11 processes select combinations of detectors 1, 2, 3 . . . , and 10, 11, 12 . . . in small groups chosen by the computer in a predetermined order of significance. For example, the missile 503 may be determined the greatest threat and therefore allocated the prime detectors and computing resources. The computed trajectories of recognized objects such as 502, 503 and 504 (a plane, a missile and a drone) may be made available for transmission as plots and statistics for others, even though decisions, such as shooting down the missile 503 with rockets 520 will have been predetermined by the computer and performed in milliseconds.

For recognition we can adapt training algorithms, such as those described by C. M. Bishop in *Pattern Recognition and Machine Learning* (2006). These can be simplified knowing the anticipated shape, size, color, markings etc. of the aircraft, missiles, rockets, drones, etc. expected in the area. These can be stored in the templates section 701 of the computer 702. Into the algorithms will be built the expectation that certain flying objects will recur regularly, intact and moving on appropriate trajectories. The computer 702 will also be smart enough to detect anomalies in size, speed and identification of all objects and be made to react accordingly.

Data in an abbreviated form may be transmitted over the Internet (which has many redundant channels), through cellular communications channels such as 3G or LTE, or using Immarsat Global Xpress, all of whom provide high-bandwidth connections. If critical the system can use underground fiber-optics 712 (with vast bandwidth) to remote bunkers. By whichever transmission method the data can be decompressed and shown on remote display 710, and can be sent to storage in a remote unit 711.

In more detail: In FIG. 11 the incoming data to computer 702 is tagged with its instantaneous coordinates from a Global Positioning System. This input is fed into a processor (a section of computer 702) which has internal DSP functions to create the enhanced image stabilization as necessary for images from distant objects. For transmission across the Internet another internal processor provides dual stream H.264 encoding, handles data compression, MJPEG encoding, and an output to a Physical Layer chip 707 for transmission over the Internet cloud 708 for remote 3D viewing. The processor 702 also has an output to a wireless connection which uses 802.11n for 4G communication speeds. Other local channels provided are an RS-485/RS-232 output to local storage, an HDMI output for 3D viewing on a local display 706.

At the receiving end a decoder 709 has the capacity to capture 500 MegaPixels per second and process full 3DHD of 1080p60 for a remote display 710. The rate at which scenes can unfold on this display is limited only by the vagaries of the Internet and of the wireless channels.

In this Codec description we are following MPEG-4, which is a collection of methods defining compression of audio and visual (AV) digital data beginning in 1998. It was at that time designated a standard for a group of audio and video coding formats and related technology agreed upon by the ISO/IEC Moving Picture Experts Group (MPEG) under the formal standard ISO/IEC 14496. In July 2008, the ATSC standards were amended to include H.264/MPEG-4 AVC compression and 1080p at 50, 59.94, and 60 frames per second (1080p50 and 1080p60)—the last of which is used here. These frame rates require H.264/AVC High Profile Level 4.2, while standard HDTV frame rates only require Level 4.0. Uses of MPEG-4 include compression of AV data for web (streaming media) and CD distribution voice (telephone, videophone) and broadcast television applications). We could equally use any other protocol (or combination of protocols) suitable for transferring high-speed data over airwaves or land-lines.

This invention relates to the remote, passive ranging of objects which are of interest to military observers and others. The addition of a dimension beyond 2D replicates the vision of the human eye and contributes the perception of depth, and adding valuable information for the inspection of diverse (in this case flying) objects. These can be instantaneously compared and sorted against three-dimensional (3D) templates which may reflect the ideal for that particular object. With advanced object recognition software inspection can be done at high speed and with great accuracy. The images can also be compressed in real time for high-speed transmission for remote display or analysis, or sent for compact storage. The techniques of this invention are applicable in the visible, infra-red, microwave and ultra-violet portions of the spectrum, and may apply also to sonar or ultrasound.

While the invention has been described and illustrated in general as a method for recognizing, tracking and evaluating three dimensional objects such as aircraft and missiles, in fact to those skilled in the art, the techniques of this invention can be understood and used as means for creating and perfecting three-dimensional recognition, inspection and measurement tools for various subjects throughout the electro-magnetic spectrum and beyond.

The techniques of this invention may be applied whether detectors are moving relative to fixed objects, or objects are moving relative to fixed detectors.

It may be understood by those skilled in the art that although specific terms may be employed in this invention, they are used in a generic and descriptive sense and must not be construed as limiting. The scope of this invention is set out in the appended claims.

I claim:

1. A computer-implemented method of using a plurality of imaging devices, positioned in a spaced apart relationship with each other, to create a new image of an object from a new viewpoint where an imaging device is not positioned, said method comprising:
   capturing images of said object with each of said plurality of imaging devices;
   projecting epipoles from an image plane of said each of said plurality of imaging devices to infinity;
   positioning all image planes coplanar with each other;
   selecting a center position of a new viewpoint;
   linking, with baselines, said center position of said new viewpoint with centers of plurality of imaging devices;
   running epipolar lines, parallel to a respective baseline, from key features of a captured image by said plurality of imaging devices;
   intersecting epipolar lines from each respective key feature in said each of said plurality of imaging devices to define corresponding key features in said new viewpoint; and
   aligning, using matrix transformations, captured images from said plurality of imaging devices at corresponding respective key features in said new viewpoint to create said new image.

2. The method of claim 1, wherein said each of said plurality of imaging devices comprises a camera with a lens.

3. The method of claim 1, wherein said plurality of imaging devices comprises two imaging devices.

4. The method of claim 1, further comprising tracking said object with said captured images and said new image, said object being a moving object.

5. The method of claim 1, wherein said object comprises a plurality of objects and said method further comprises tracking said plurality of objects with said captured images and said new image, each of said plurality of objects being a moving object.

6. The method of claim 1, further comprising identifying said object with said captured images and said new image.

7. The method of claim 1, further comprising replacing an image from any failed imaging device from said plurality of imaging devices with said new image from said new viewpoint.

8. The method of claim 1, further comprising calculating distances to said object from any one of said plurality of imaging devices and said new viewpoint.

9. The method of claim 8, further comprising assigning one or more of said baselines based on said distance(s) to said object.

10. The method of claim 8, further comprising scaling a size of said new image in said new viewpoint.

11. The method of claim 8, further comprising stretching and compressing said new image based on a ratio between a distance to said object from said new viewpoint and a distance to said object from any one of said plurality of imaging devices.

12. The method of claim 8, further comprising normalizing said new image by inverting a ratio between a distance to said object from said new viewpoint and a distance to said object from any one of said plurality of imaging devices.

13. The method of claim 1, wherein said positioning of said all image planes coplanar with each comprises progressively aligning said each of said plurality of imaging devices by way of primary, secondary and fine alignments.

14. The method of claim 1, further comprising projecting a curved image field in front of a lens of said each of said plurality of imaging devices, if a single epipole is not convergent or parallel to other epipoles.

15. The method of claim 1, further comprising converting polar coordinates into orthogonal coordinates.

16. The method of claim 1, further comprising creating additional new images of said object from additional new viewpoints and generating a 3D image of said object.

17. A computer-implemented method for identifying a moving object with a plurality of imaging devices positioned in a spaced apart relationship with each other, said method comprising:

capturing an image of said moving object with each of said plurality of imaging devices;

projecting epipoles from an image plane of said each of said plurality imaging devices to infinity;

positioning all image planes coplanar with each other;

selecting a center position of at least one new viewpoint;

linking, with baselines, said center position of said at least one new viewpoint with centers of plurality of imaging devices;

running epipolar lines, parallel to a respective baseline, from key features of a captured image by said each of said plurality of imaging devices;

intersecting epipolar lines from each respective key feature in said each of said plurality of imaging devices to define corresponding key features in said at least one new viewpoint;

aligning, using matrix transformations, captured images from said plurality of imaging devices at corresponding respective key features in said at least one new viewpoint to create at least one new image of said object; and comparing a combination image comprising said at least one new image and said captured image with a template image.

18. The method of claim 17, further comprising tracking said moving object and deciding to accept said object as harmless or destroy said object with a weapon.

19. A system for at least identifying an object, comprising:

a plurality of imaging devices positioned in a spaced apart relationship with each other in a polygon pattern, each capturing an image of said object; and a computer configured to:

project epipoles from an image plane of said each of said plurality imaging devices to infinity;

position all image planes coplanar with each other;

select a center position of at least one new viewpoint;

link, with baselines, said center position of said at least one new viewpoint with centers of plurality of imaging devices;

run epipolar lines, parallel to a respective baseline, from key features of a captured image by said each of said plurality of imaging devices;

intersect epipolar lines from each respective key feature in said each of said plurality of imaging devices to define corresponding key features in said at least one new viewpoint;

align, using matrix transformations, captured images from said plurality of imaging devices at corresponding respective key features in said at least one new viewpoint to create at least one new image of said object; and compare a combination image comprising said at least one new image and said captured images with a template image.

* * * * *